E. WEIDLEIN.
CLEANING ATTACHMENT FOR HORSE RAKES.
APPLICATION FILED AUG. 28, 1908.
909,721.
Patented Jan. 12, 1909.
2 SHEETS—SHEET 2.
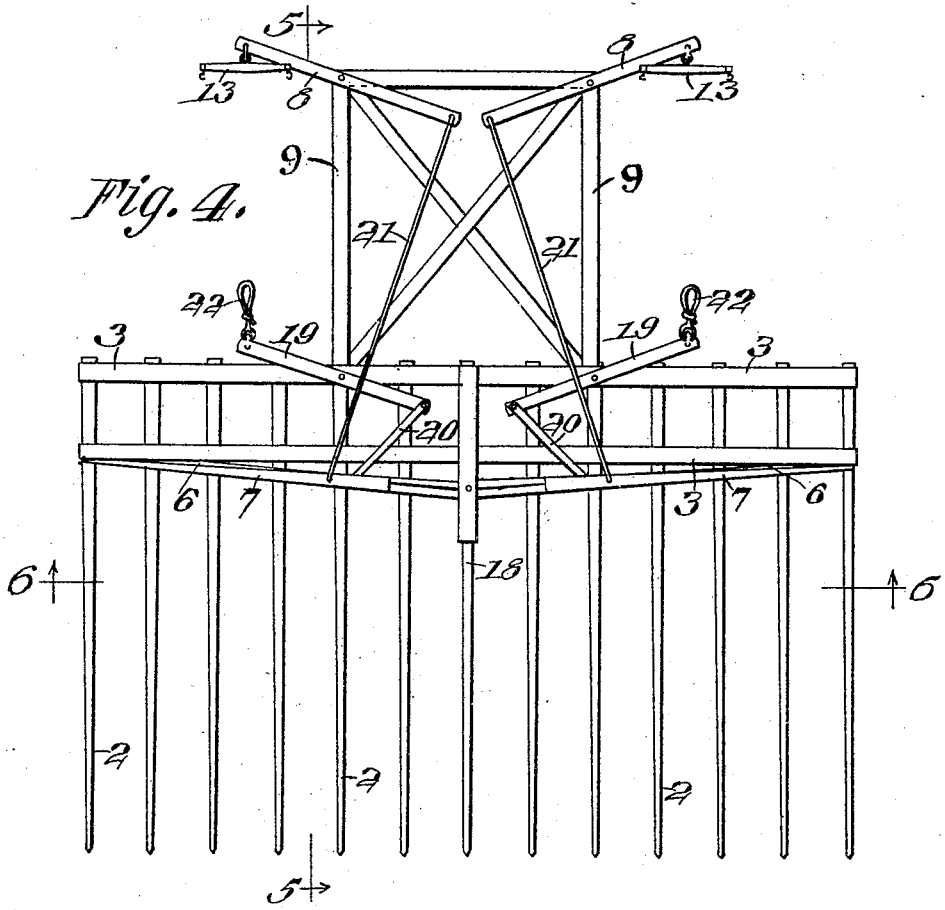
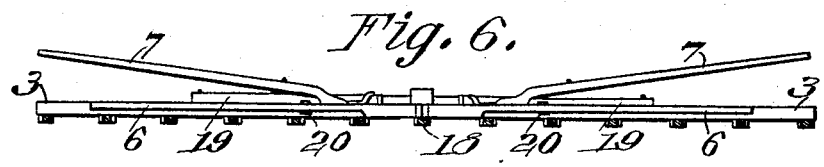
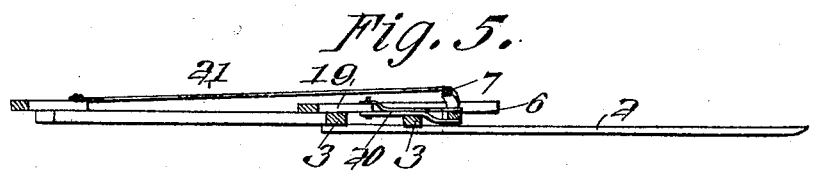
Witnesses
E. D. B. Brown
C. H. Griesbauer
Inventor
Edward Weidlein,
By H. R. Willson & Co.
Attorneys

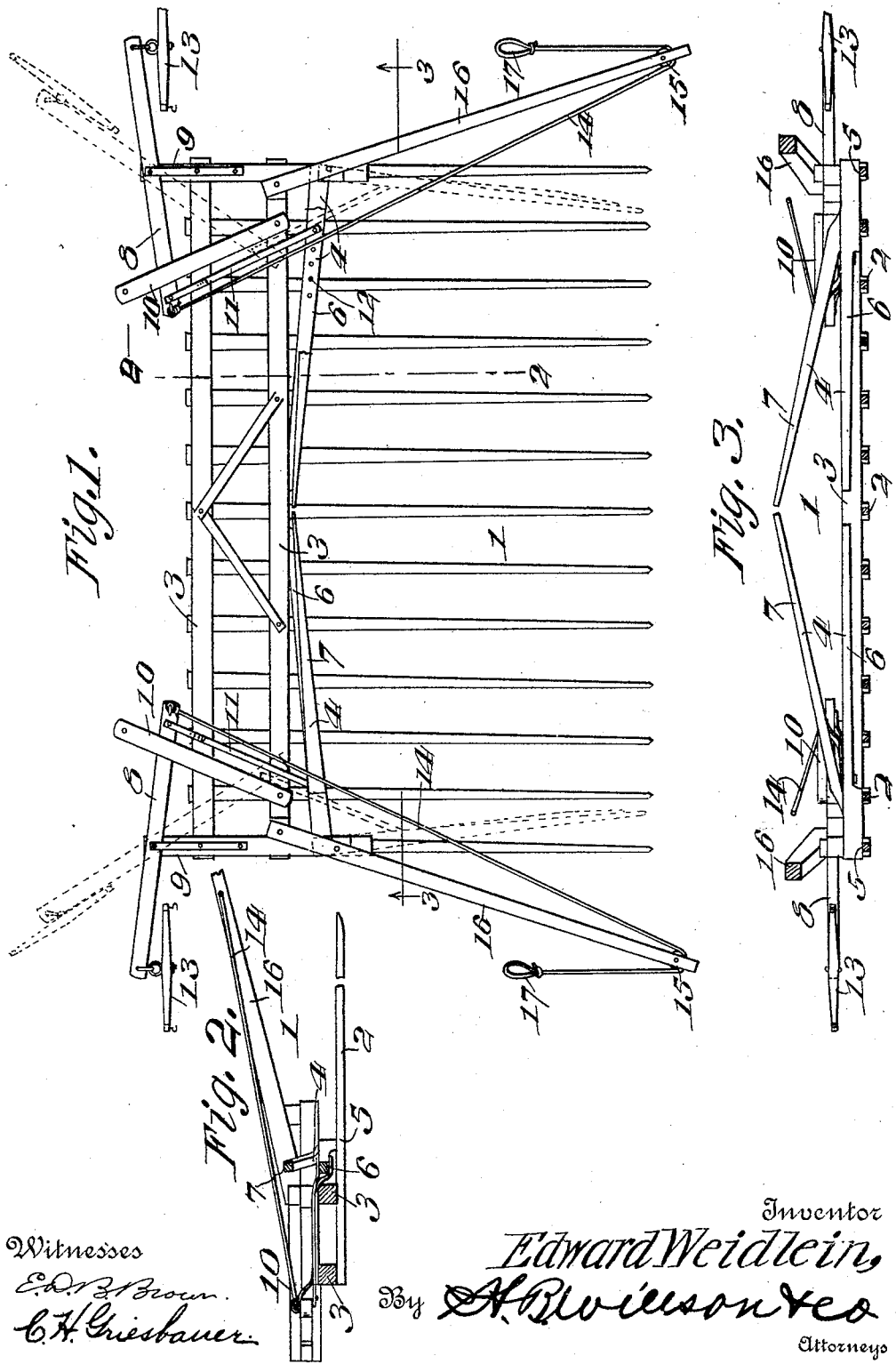

UNITED STATES PATENT OFFICE.

EDWARD WEIDLEIN, OF AUGUSTA, KANSAS.

CLEANING ATTACHMENT FOR HORSE-RAKES.

No. 909,721.  Specification of Letters Patent.  Patented Jan. 12, 1909.

Application filed August 28, 1908. Serial No. 450,618.

*To all whom it may concern:*

Be it known that I, EDWARD WEIDLEIN, a citizen of the United States, residing at Augusta, in the county of Butler and State of Kansas, have invented certain new and useful Improvements in Cleaning Attachments for Horse-Rakes; and I do declare the following to be a full, clear, and exact description of the invention, such as will enable others skilled in the art to which it appertains to make and use the same.

This invention relates to new and useful improvements in cleaning attachments for horse rakes for gathering hay or the like, and has for its object to provide improved means whereby the hay may be automatically ejected from the rake by backing the horses or other draft animals a very slight extent.

With these and other objects in view, the invention consists of certain novel features of construction, combination and arrangement of parts, as will be more fully described and particularly pointed out in the appended claims.

In the accompanying drawings, Figure 1 is a plan view of the rake embodying my improvements, the approximate position of the ejector bars when in ejecting position being indicated by dotted lines; Fig. 2 is a transverse section taken on the line 2—2 of Fig. 1 looking in the direction indicated by the arrows; Fig. 3 is a section taken at right angles to Fig. 2 looking in the direction indicated by the arrows; Fig. 4 is a plan view of a slightly modified form of the invention; Fig. 5 is a transverse section taken on the line 5—5 of Fig. 4 looking in the direction indicated by the arrows; and Fig. 6 is a view taken on line 6—6 of Fig. 5 looking in the direction indicated by the arrow.

In the embodiment illustrated, the attachment is shown as applied to an ordinary horse rake 1 for gathering hay or the like, said rake as is usual comprising a plurality of parallel teeth 2 connected at their rear ends by a pair of parallel brace bars 3. In the preferred form of the invention an ejector bar 4 is pivoted to one of the rake teeth 5, at each side of the rake in position to swing outwardly as indicated by the dotted lines in Fig. 1. As shown, each of said bars comprises a lower piece 6 which swings in an approximately horizontal plane over the rake teeth, and an upper piece 7 which is inclined upwardly toward the center of the rake. An operating lever 8 is pivoted centrally of its ends to the rearwardly projecting end of a suitable support 9 arranged at each side of the rake, the inner ends of said operating levers working in suitable guides 10 which are mounted at a proper inclination upon the brace bars 3. A connecting bar 11 is connected at its rear end with the inner end of each of the operating bars, and at its forward or opposite end with either of a series of vertical apertures 12 formed in the lower piece 6 of its ejector bar. The outer end of each of the operating bars 8, is also provided with a whiffletree 13 to which the draft animal or animals are attached. Operating cords 14 are attached to the inner ends of the operating levers and extend forwardly over suitable pulleys 15, arranged at the forward ends of forwardly and outwardly inclined supporting bars 16, the free ends of the operating cords being provided with loops 17, which are suitably connected with the breast straps of the draft animals. In the modified form of the invention illustrated in Figs. 4 to 6 inclusive the ejector bars are pivoted to the central tooth 18 of the rake at points in advance of the brace bars 3 and in position to swing toward and from the center of the rake. In this case the supports 9 extend rearwardly from the rear brace bars 3 suitable distances from the sides of the rake as clearly indicated in Fig. 4. Additional bars 19 are provided which are pivoted to the rear brace bars 3 and connected with the ejector bars by connecting bars 20. The operating cords and the forwardly extending supporting bars therefor, are also dispensed with in this case and the inner ends of the operating levers connected with the ejector bars by flexible elements 21 and the opposite ends of said levers provided with loops 22, which are connected with the breast straps of the draft animals. The construction illustrated in Figs. 4 to 6 inclusive is provided when it is desired that the draft animals shall be located in the rear of the rake instead of at the sides thereof.

In practice, after a load of hay has been gathered upon the rake the draft animals are backed slightly which operates to move the rake from under the hay and at the same time to swing the ejector bars into ejecting position to eject the hay therefrom. It will be evident that the stroke of the ejector bars may be regulated by attaching the connecting bars 11 with the proper apertures 12 thereof.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. In combination with a rake, a cleaning attachment comprising ejector bars pivoted to the rake, operating levers pivoted to the rake in rear of the ejector bars, connections between the ejector bars and operating levers, forwardly extending supporting bars attached to the rake, pulleys at the forward ends of said supporting bars, and operating cords attached to the inner ends of the operating lever and extending forwardly over said pulleys.

2. In combination with a rake, a cleaning attachment comprising ejector bars pivoted to the rake, operating levers pivoted to the rake in rear of the ejector bars, connections between the ejector bars and operating levers, forwardly extending supporting bars attached to the rake, pulleys at the forward ends of said supporting bars, operating cords attached to the inner ends of the operating lever and extending forwardly over said pulleys, the free ends of said operating cords having loops.

3. In combination with a rake, a cleaning attachment comprising ejector bars pivoted to the rake in position to swing toward and from the center thereof, operating levers pivoted to the rake in rear of the ejector bars and means for adjustably connecting the ejector bars with the operating levers.

4. In combination with a horse rake, a cleaning attachment comprising ejector bars pivoted to opposite sides of the rake in position to swing toward and from the center thereof, operating levers pivoted to the rake in the rear of the ejector bars, means for adjustably connecting the inner end of said levers with the ejector bars, means for attaching draft animals to the outer ends of said operating levers, forwardly and outwardly extending supporting bars attached to the rake, pulleys mounted at the forward ends of said supporting bars, and operating cords connected with the inner ends of said levers and extending forwardly over said pulleys, the free ends of said cords having loops.

5. In combination with a horse rake, a cleaning attachment comprising ejector bars pivoted to opposite sides of the rake in position to swing toward and from the center thereof, each of said bars comprising a lower piece adapted to move in a plane approximately parallel and above the rake teeth, and an upper piece which extends at an upward inclination toward the center of the rake.

In testimony whereof I have hereunto set my hand in presence of two subscribing witnesses.

EDWARD WEIDLEIN.

Witnesses:
DANIEL S. FOLTZ,
NEWTON A. YEAGER.